United States Patent [19]

Katzen et al.

[11] 4,290,914

[45] * Sep. 22, 1981

[54] CATALYTIC MATERIALS AS FOR OLEFIN POLYMERIZATION

[75] Inventors: Stanley J. Katzen, Cincinnati; Louis J. Rekers, Wyoming, both of Ohio

[73] Assignee: National Petro Chemicals Corp., New York, N.Y.

[*] Notice: The portion of the term of this patent subsequent to Jul. 11, 1995, has been disclaimed.

[21] Appl. No.: 159,992

[22] Filed: Jun. 16, 1980

Related U.S. Application Data

[60] Continuation of Ser. No. 923,111, Jul. 10, 1978, abandoned, which is a division of Ser. No. 759,213, , and a continuation-in-part of Ser. No. 759,213, Jan. 13, 1977, Pat. No. 4,100,104.

[51] Int. Cl.$^3$ .............. C08F 4/78; B01J 31/14; B01J 21/12
[52] U.S. Cl. ................... 252/428; 252/430; 252/431 P; 252/455 R; 526/97; 526/129; 526/130; 526/132; 526/156
[58] Field of Search ........... 252/428, 430, 426, 431 R, 252/431 P, 437, 455 R, 458

[56] References Cited

U.S. PATENT DOCUMENTS

| | | | |
|---|---|---|---|
| 3,417,030 | 12/1968 | O'Hara et al. | 252/455 R |
| 3,780,011 | 12/1973 | Pullukat et al. | 260/94.9 |
| 3,984,351 | 10/1976 | Rekers et al. | 252/430 |
| 3,985,676 | 10/1976 | Rekers et al. | 252/428 |
| 4,100,104 | 7/1978 | Katzen et al. | 252/428 |

FOREIGN PATENT DOCUMENTS

| | | | |
|---|---|---|---|
| 2525411 | 1/1976 | Fed. Rep. of Germany . | |
| 2525511 | 1/1976 | Fed. Rep. of Germany . | |
| 907579 | 10/1962 | United Kingdom | 526/129 |
| 912275 | 12/1962 | United Kingdom . | |
| 1191774 | 5/1970 | United Kingdom . | |

*Primary Examiner*—P. E. Konopka
*Attorney, Agent, or Firm*—Kenneth D. Tremain

[57] ABSTRACT

Catalysts, especially for olefin polymerization are prepared by coating an aluminum compound on a selected high pore volume silica gel, and calcining the support at temperatures of from about 200° to 2000° F. The preferred catalyst is prepared with an inorganic support material as aforesaid, thereafter depositing an organophosphoryl chromium compound thereon, and activating the thus-treated support by heating in a non-reducing, preferably oxygen-containing, atmosphere at temperatures of from about 800° to 2000° F. The activated, supported catalyst composition may, but need not necessarily, be combined with a metallic and/or non-metallic reducing agent, to provide a catalyst system useful in the polymerization of 1-olefins.

2 Claims, No Drawings

CATALYTIC MATERIALS AS FOR OLEFIN POLYMERIZATION

This is a continuation, of application Ser. No. 923,111, filed July 10, 1978, now abandoned which is a division and continuation-in-part of copending and commonly assigned Application Ser. No. 759,213 filed Jan. 13, 1977 now U.S. Pat. 4,100,104.

BACKGROUND OF THE INVENTION

The modification of silica gels for catalytic activity is known as discussed in Burwell, Chemtech, pp. 370–377 (1974).

The use of chromium compounds in the polymerization of olefins is also well-known. U.S. Pat. Nos. 2,825,721 and 2,951,816 teach the use of $CrO_3$ supported on an inorganic material such as silica, alumina or combinations of silica and alumina, and activated by heating in reducing atmospheres, to polymerize olefins. When, however, a catalyst system of this type is used in techniques such as the well-known particle-form process, the resins produced, while useful in many applications, are unsatisfactory for others because of a deficiency in certain properties such as melt index.

Attempts to improve the properties of polyolefins produced using supported, heat-activated chromium oxide catalysts have been made by adding various compounds to the supported chromium oxide prior to the heat activation thereof. For example, U.S. Pat. No. 3,622,522 shows that an alkoxide of gallium or tin may be added to supported chromium oxide prior to heat activation (and compares addition of aluminum isopropoxide unfavorably). U.S. Pat. No. 3,715,321 suggests adding a compound of a Group II-A or Group III-B metal to supported chromium oxide prior to heat treatment, whereas U.S. Pat. No. 3,780,011 discloses adding alkyl esters of titanium, vanadium or boron, and U.S. Pat. No. 3,484,428 discloses adding alkyl boranes to such a catalyst.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,387. The use of phosphorus-containing chromate esters in olefin polymerization catalysts has also been disclosed in the aforesaid U.S. Pat. No. 3,704,287; and in U.S. Pat. No. 3,474,080. Other such catalysts are described in U.S. Pat. No. 3,985,676.

Use of the above chromium compound catalysts in Ziegler-type coordination catalyst systems has also been proposed. As is well-known in the art, such catalysts frequently additionally comprise organometallic reducing agents such as, for example, trialkyl aluminum compounds. Ziegler-type catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500; and 3,985,676.

It has also been disclosed, in U.S. Pat. No. 3,984,351, owned by the assignee of the present invention, that the properties of olefin polymers, e.g., melt indexes, may be substantially improved by the use of a catalyst prepared by depositing chromium and aluminum compounds on an inorganic support material and heat-activating the supported composition in a non-reducing, preferably oxygen-containing atmosphere, at a temperature of from about 300° C. (572° F.) up to the decomposition temperature of the support. The resulting material, as preferably combined with a metallic and/or non-metallic reducing agent, e.g., a trialkyl borane, provides a catalyst system capable of producing polymers having improved flow properties and shear responses in addition to increased melt indexes.

It is among the objects of the present invention to provide yet a further improved technique for preparing catalytic materials, especially olefin polymerization catalysts, and a polymerization process utilizing the same which results in the formation of polymers having increased melt indexes, and improved flow properties, shear responses and other desired characteristics.

SUMMARY OF THE INVENTION

In accordance with the present invention it has been found that an improved olefin polymerization catalyst may be prepared by a technique involving:

(a) coating a solid, inorganic support material having surface hydroxyl groups with an aluminum compound which is capable of reacting with said surface hydroxyl groups and which, preferably, has the formula $Al(X)_a(OR)_b$, wherein X is R, a is 0–2, b is 1–3, a+b is 3, and R is an alkyl group having from 1 to 8 carbon atoms;

(b) calcining the support material having the aluminum compound coated thereon at temperatures of at least about 200° F.;

(c) depositing a chromium-containing compound on the support which is capable of reacting with the surface hydroxyl groups and which, preferably, is an organophosphoryl chromium reaction product of chromium trioxide and an organophosphorus compound of the formula:

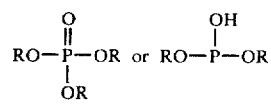

wherein R is hydrogen or alkyl, aralkyl, aryl or cycloalkyl, the alkyl moieties of which may have from 1 to 12 carbon atoms, but in which at least one R is other than hydrogen; and (d) activating the thus treated support in a non-reducing atmosphere at temperatures of from 800° F. and up to the decomposition temperature of the support.

The successive heat treatments are believed to effect a "double activation" during which the aluminum and chromium-containing compounds react with the surface hydroxyl groups on the inorganic support material. Since, however, the exact chemical mechanism is not completely understood, it will be appreciated that the invention should not in any way be construed as limited to that postulated hereinabove. Whatever the mechanism, use of the olefin polymerization catalyst produced as described herein has, surprisingly, been found to result in the formation of polyethylene and other olefin polymers having increased melt indexes and improved flow properties and shear responses.

It has also been found that the intermediate aluminum treated activated product, when prepared utilizing a selected high pore volume silica gel, has unique utility as a hydrogenation or cracking catalyst e.g., in the isomerization of hexane, with excellent activity, selectivity, stability and attrition resistance. Thus, such materials may be used as supports with other catalytic promoters in a variety of catalyzed reactions, or employed directly for isomerization, reforming, cracking, polymerization, alkylation, dealkylation, hydrogenation, dehydrogenation or hydrocracking reactions.

For example, low pressure isomerization of xylene is conducted to generate additional p-xylene from a mixture of o- and m-xylene resulting from fractional crystallization to separate p-xylene from an equilibrium mixture of the three isomers. The intermediate product from calcining the aluminum treated gel is effective for that style of isomerization using parallel reactors, one of which is on stream while another is subjected to burning regeneration to remove coke deposited on the catalyst during the reaction step. After double activation, the catalyst possesses hydrogenation activity and is adapted for use in high pressure xylene isomerization under hydrogen pressure to inhibit coke formation. In related technologies of disproportionation of toluene to xylenes and benzene, as in reaction of ethylene with benzene to make ethyl benzene, the catalyst is also effective. Disproportionation may be under hydrogen pressure over the doubly activated catalyst or at lower pressure (no hydrogen) with catalyst which has undergone only activation with aluminum. For ethylation of benzene or toluene to make raw material for preparation of styrene or methyl styrene, the intermediate product will usually be preferred.

Because the technique for preparation of the intermediate affords flexibility in adjusting acid activity of the base material, it provides excellent options as a base material for various hydrotreating processes such as hydrofinishing of lubricant and full fractions, hydrodesulfurization, denitrogenation and demetallizing of petroleum and shale oil fractions. The pore diameters are well suited to such operations in which metal may be deposited from the treated stock without unduly early blockage of pores. The hydrogenation component deposited on such catalyst may be chosen from the known range of metals of varying activity from the highly active palladium through nickel and the like to cobalt molybdate or the doubly activated catalyst which is the final product described in detail herein. By judicious balance of activity of the aluminum treated base and hydrogenation activity of the associated metal, the invention provides capability to tailor-make catalyst for a desired service.

The silica gel employed is that of U.S. Pat. Nos. 3,652,214; 3,652,215; 3,652,216; 3,801,705; 3,819,811; 3,978,002 and 4,053,565.

The inorganic support materials useful in the present invention include those normally employed for supported chromium catalysts used in olefin polymerizations, e.g., those described in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. No. 3,652,214, 3,652,215, 3,652,216, 3,978,002 and 4,053,565, which silica xerogels have a surface area in the range of 200 to 500 m²/g, and a pore volume greater than about 2.0 cc/g, a major portion of which pore volume is provided by pores having pore diameters in the range of from 300 to 600 Å.

The aluminum compound to be coated on the inorganic support material is, desirably, an aluminum alkoxide capable of reacting with the surface hydroxyl groups of the support and having the formula:

$$Al(X)_a(OR)_b$$

wherein X is R, a is 0–2, b is 1–3, a+b is 3, and R is an alkyl group having from 1 to 8 carbon atoms.

Examples of aluminum alkoxides so useful include aluminum sec-butoxide, aluminum ethoxide, aluminum isopropoxide; and alkyl aluminum alkoxides such as ethyl aluminum ethoxide, methyl aluminum propoxide, diethyl aluminum ethoxide, or diisobutyl aluminum ethoxide.

The aluminum compound may be coated on the inorganic support by vapor deposition or by impregnating the support with a solution of the compound in a suitable inert solvent, normally an anhydrous organic solvent. Organic solvents so useful include aliphatic, cycloalkyl and alkaryl hydrocarbons and their halogenated derivatives. A preferred solvent of this type is dichloromethane.

In accordance with the double activation treatment hereof, the aluminum compound-coated support is initially calcined in a non-reducing atmosphere, preferably in an oxygen-containing atmosphere, at temperatures of at least about 200° F., and up to the decomposition temperature of the support. Typically, the aluminum compound-coated support is heated at temperature of from about 200° F. to 2000° F., preferably at from about 500° to 1500° F.

The period required for calcination varies, depending upon the temperatures utilized, from one-half hour or less, to 50 hours or more. Normally, calcination is effected over a period of from about 2 to 12 hours.

The non-reducing atmosphere, which is preferably air or other oxygen-containing gas, should be dry and preferably should be dehumdified to a moisture content of but a few parts per million to obtain maximum catalyst activity. Typically, air used in the procedure described herein is dried to less than 2–3 ppm of water.

The chromium-containing compound subsequently deposited on the calcined support comprise those described in U.S. Pat. No. 3,984,351, and 3,985,676, including chromium trioxide, the hindered ditertiary polyalicyclic chromate esters, silyl chromate esters and, preferably, the reaction product of chromium trioxide with organophosphorus compounds having the formula

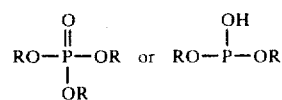

wherein R is hydrogen, or an alkyl, aralkyl, aryl, or cycloalkyl group the alkyl moieties of which may have from 1 to 12 carbon atoms, desirably from 2 to 8 carbon atoms, but in which at least one R is other than hydrogen. The preferred organophosphorus compounds are trialkyl phosphates such as triethyl phosphate.

The chromium-containing compound is deposited on the treated catalyst support in the same manner as the aluminum compound coating, viz., either by vapor deposition or by impregnation with a solution in a suitable inert solvent such as the anhydrous organic solvents identified hereinabove. Preferably, the chromium compound is deposited by the techniques more fully described in U.S. Pat. No. 3,985,676, the disclosure of which is incorporated by reference herein. The aluminum compound may similarly be coated on the inert support material utilizing such techniques.

Double activation is completed in accordance with the present invention by subjecting the thus aluminum and chromium compound-treated support to activation in a non-reducing atmosphere, preferably in an oxygen-containing atmosphere, at temperatures above about 800° F. up to the decomposition temperature of the support. Activation is suitably carried out at temperatures within the range of from about 800° F. to 2000° F., best results having been obtained by activation at temperatures of from about 1550° F. to 1800° F. Activation may be carried out, depending on the temperatures utilized, for periods varying from about one-half hour or less to 50 hours or more, most frequently, for periods varying from about 2 to 12 hours. The non-reducing atmosphere is suitably dehumidified in much the same manner as discussed hereinabove in connection with the prior calcination step.

The most effective catalysts of the present invention are those containing the chromium compound in an amount such that the amount of Cr by weight based on the weight of the support is from about 0.25 to 2.5% and, preferably, is from about 0.5 to 1.25%, although amounts outside of these ranges still yield operable catalysts. The aluminum compound should be added in sufficient amounts to provide from about 0.1 to 10% by aluminum by weight based on the weight of the support and, preferably, from about 0.5 to 5.5%, although other amounts outside of those ranges can be used to prepare operable catalysts.

The double-activated support chromium/aluminum catalysts of the invention may, but need not necessarily, be used in combination with metallic and/or non-metallic reducing agents, to provide novel catalyst systems for the polymerization of olefins. Examples of metallic reducing agents which may be employed as co-catalysts, if desired, including the trialkyl aluminums, such as triethyl aluminum and triisobutyl aluminum; alkyl aluminum halides; alkyl aluminum alkoxides; dialkyl zinc; dialkyl magnesium; and metal borohydrides including those of the alkali metals, especially sodium, lithium and potassium, and of magnesium, beryllium and aluminum. Non-metal reducing agents which may be similarly so utilized include alkyl boranes such as triethyl borane, triisobutyl borane, and trimethyl borane; and hydrides of boron such as diborane, pentaborane, hexaborane and decaborane.

The double-activated, supported chromium-/aluminum compound catalysts may, when utilized with a metallic or non-metallic reducing agent, be combined therewith prior to being fed to an olefin polymerization reactor, or the co-catalysts may be fed separately into such a reactor. In proportioning the amount of metallic or non-metallic reducing agent to the amount of chromium compound used in such co-catalyst systems, fairly wide latitude is available, but some guidelines have been established consistent with good yields, favorable polymer properties and economic use of materials. For example, in the use of metallic and/or non-metallic reducing agents with an amount of chromium compound sufficient to yield about 1% Cr by weight of the support, the parameters set forth below are representative. The atomic ratios are based upon a calculation of the metal in the metallic reducing agent and/or the non-metal in the non-metallic reducing agent versus the chromium content present in the supported chromium compound catalyst component.

For example, based upon a catalyst composition containing about 1% by weight of Cr based upon the weight of the support, the preferred amount of organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is about from 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

Another example of an organometallic reducing agent for use in co-catalyst systems which may be utilized in accordance with the present invention is triethyl aluminum. Again, based upon a catalyst composition containing about 1% by weight of Cr based upon the weight of the support, the preferred amount of triethyl aluminum (TEA) is about 6.6% by weight based upon the weight of the support, giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl borane (TEB) is a non-metallic reducing agent which may be employed as a reducing agent with the catalyst of the present invention. Again, based upon a catalyst composition containing about 1% by weight of Cr based upon the weight of the support, the preferred amount of TEB is about 5% by weight based upon the weight of the support, giving a B/Cr atomic ratio of about 2.7/1. The preferred range of atomic ratios of B to Cr is from about 0.1/1 to 10/1, or from about 0.19% to about 19% TEB. The overall practicable limits, in terms of a B/Cr ratio, are from about 0.01/1 to about 20/1, and in terms of weight are from about 0.02% to about 38% by weight based upon the weight of the support.

As indicated above, the catalysts hereof may be employed in conventional olefin polymerization processes, in particular for the polymerization of 1-olefins having 2-8 carbon atoms. The catalysts may be utilized employing those polymerization temperature and pressure conditions generally employed in the art, e.g., at temperatures of from about 100° F. to about 400° F., preferably from about 160° F. to 230° F. and under pressures of from about 200 to 1000 psig, preferably from about 300 to 800 psig, as are conventionally used in slurry or particle form polymerizations.

The following examples illustrate preferred modes of carrying out the preparation of the novel catalyst hereof, and of the use of such catalyst for the preparation of polyethylenes having increased melt indexes and other desirable properties. It will be understood that the examples are illustrative only and that various modifications may be made in the specified parameters without departing from the scope of the invention.

Unless otherwise indicated, in the following examples all parts and percentages are given by weight and all temperatures in °F.

CATALYST PREPARATION PROCEDURE

Catalyst samples were prepared in accordance with this invention, employing the following technique:

I.

A. A silica xerogel having a pore volume of about 2.5 cc/g (prepared in accordance with the disclosure of U.S. Pat. No. 3,652,215) was added to a 2000 ml, 3-neck round bottom flask equipped with a stirrer, nitrogen inlet and Y-tube with water condenser. A nitrogen atmosphere was maintained during the coating operation. Dichloromethane was then added to the flask containing the silica gel (6.5 grams dichloromethane per gram of silica gel) and stirring was commenced to insure uniform wetting of the gel.

A 50% solution of aluminum sec-butoxide in dichloromethane was thereafter prepared in a pressure equalizing dropping funnel and the funnel attached to the stirred flask. The aluminum sec-butoxide solution was gradually added to the flask at the rate of 10 grams of solution per minute. After the addition of the solution was complete the slurry in the flask was stirred for about one-half hour. The coated gel was then dried in a rotary evaporator at temperatures up to about 140° F. and 29 inches Hg vacuum.

B. The aluminum compound-coated support was calcined by placing the treated support in a cylindrical container and fluidizing the same with dry air at a 0.20 foot per minute lineal velocity; the fluidized bed was heated to a predetermined temperature and maintained at such temperature for six hours. The calcined support was thereafter recovered in dry powder form, and could be employed directly in catalysis, as described hereinabove.

II.

A. The calcined composition prepared as described above was added to a 2000 ml. 3-neck, round bottom flask equipped with a stirrer, nitrogen inlet and Y-tube with water condenser. A nitrogen atmosphere was maintained during the coating operation. Dichloromethane was then added to the flask containing the silica gel and stirring was commenced to insure uniform wetting of the gel. A dichloromethane solution of the reaction product of $CrO_3$ and triethyl phosphate, prepared as described in U.S. Pat. No. 3,985,676, was then added in sufficient quantity to provide a dry coated catalyst containing about 1% by weight of Cr. The supernatant liquid was removed by filtration and the coated gel dried in a rotary evaporator at 140° F. and under 29 inches of Hg.

B. Double-activation of the supported chromium/aluminum catalyst was effected by heat-activating the same in a fluidized bed maintained under conditions similar to those utilized in the prior calcination, the bed being maintained at a predetermined temperature for a period of six hours. The thus activated, supported catalyst was recovered in powder form.

Catalysts thus prepared were employed in a series of particle form polymerization reactions and the melt indexes of the polymer products produced therewith determined and compared as indicated hereinafter.

EXAMPLES 1 AND 2

Double-Activation of Aluminum-Organophosphoryl Chromium Catalyst and Use together with Triethyl Borane Reducing Agent Organophosphoryl chromium catalysts were prepared as described hereinabove, the aluminum alkoxide-treated supports being calcined at 1000° F. and, following deposition of the organophosphoryl chromium coating thereon, being double-activated at 1650° F.

The catalysts thus prepared were utilized in polymerization runs conducted both in the presence of hydrogen at 30 psi as a modifier (Example 1), and without the use of any hydrogen pressure (Example 2). The polymerizations were carried out in the presence of a triethyl borane reducing agent, introduced into the reactor in an amount equivalent to 2.9 gram atoms of boron per gram of chromium present in the catalyst. Each of the polymerizations was carried out at a temperature of 210° F. for a period of 1 hour. The polymer products were thereafter recovered and their melt indexes determined by analysis.

For purposes of comparison two further catalysts were prepared by the impregnation of the same microspheroidal silica gel with chromium trioxide. One such control composition (Control A) was utilized as a catalyst system for ethylene polymerization in the presence of a hydrogen atmosphere ($H_2 = 30$ psi), while the other control catalyst (Control B) was used to catalyze the polymerization in the absence of hydrogen.

Samples of the respective catalysts were prepared employing the double activation technique described hereinabove, while other samples were prepared by "single" activation at 1650° F., i.e., without calcining the treated material between deposition of the aluminum secondary butoxide and chromium compound-containing coatings on the treated support.

The results thus obtained are tabulated in Table I below. As will be seen from the table, the use of the double-activation technique for the organophosphoryl chromium supported catalyst of Examples 1 and 2 facilitated the formation of polymers having melt indexes from 3 to almost 10 times those of the polymers produced employing catalysts which had been subjected to solely a single activation operation. Such difference in polymer properties was particularly pronounced when the polymerization was carried out in the presence of a hydrogen modifier (Example 1). On the other hand, the use of double-activation of the supported chromium oxide control catalysts (Controls A and B) did not facilitate the formation of polymer products having increased melt indexes; in fact, those polymers produced in the presence of the double-activated chrome oxide supported catalysts were found to have lower melt indexes than the polyethylenes produced by the single activated chrome oxide catalysts. This was the case, whether or not the polymerization was carried out in the presence of hydrogen.

TABLE I

COMPARISON OF MELT INDEXES OF POLYMERS PRODUCED WITH CATALYSTS INCORPORATING TRIETHYL BORANE REDUCING AGENTS

| Example or Control | Catalyst | "Single" Activation Productivity (gm PE/gm Cat.) | M.I. | "Double" Activation Productivity (gm PE/gm.Cat.) | M.I. |
|---|---|---|---|---|---|
| 1 | Organophosphoryl Cr (with H$_2$ modifier) | 607 | 6.3 | 748 | 52.8 |
| 2 | Organophosphoryl Cr (no H$_2$) | 1048 | 1.7 | 514 | 9.8 |
| Control A | CrO$_3$ (with H$_2$ modifier) | 683 | 114.2 | 580 | 17.9 |
| Control B | CrO$_3$ (no H$_2$) | 704 | 17.3 | 701 | 6.8 |

EXAMPLES 3 AND 4

Double-Activation of Aluminum-Organophosphoryl Chromium Catalyst and Use without Reducing Agent Further test and control catalysts were prepared and tested in the same manner as set forth in connection with Examples 1 and 2 and Controls A and B above. In this instance, however, the respective supported organophosphoryl chromium test catalysts (Examples 3 and 4) and the supported chromium oxide control catalysts (Controls C and D) were utilized in polymerization runs without the further addition of triethyl borane or other reducing agent. Also, the polymerizations were carried out at 225° C., rather than the lower 210° F. temperature utilized in connection with the above experiments.

The melt indexes of the polyethylenes produced employing the respective catalyst compositions are recorded in Table II. Again, it is clear from the table that the polymers produced employing the double activated supported organophosphoryl chromium catalyst (Examples 3 and 4) had markedly greater melt indexes than the polyethylenes produced employing the corresponding catalysts subjected to but a "single" activation operation. On the other hand, there is no corresponding relationship between the polymer melt index and the activation treatment of the supported chrome oxide control catalysts (Controls C and D).

TABLE II

COMPARISON OF MELT INDEXES OF POLYMERS PRODUCED WITH CATALYSTS INCORPORATING TRIETHYL BORANE REDUCING AGENTS

| Example or Control | Catalyst | "Single" Activation Productivity (gm PE/gm Cat.) | M.I. | "Double" Activation Productivity (gm PE/gm.Cat.) | M.I. |
|---|---|---|---|---|---|
| 3 | Organophosphoryl Cr. (with H$_2$ modifier) | 384 | 6.4 | 333 | 11.0 |
| 4 | Organophosphoryl Cr. (no H$_2$) | 674 | 3.8 | 580 | 7.0 |
| Control C | CrO$_3$ (with H$_2$ modifier) | 114 | 24.4 | 454 | 15.4 |
| Control D | CrO$_3$ (no H$_2$) | 203 | 18.7 | 480 | 16.3 |

EXAMPLES 5–15

Catalysts Prepared under Varying Calcination Conditions During Double-Activation Further catalysts were prepared in the manner described hereinabove by coating with aluminum sec-butoxide in an amount of 3.7% by weight of the support and calcining at varying temperatures prior to deposition of the organophosphoryl chromium coating (at a level of about 0.9% Cr) thereon. The latter was deposited in the same manner as the materials of the above examples, and the thus treated catalysts were air-activated at 1650° F. as aforesaid.

The several test catalysts were admixed with a triethyl borane reducing agent in the proportion of 2.9 gram atoms of boron per gram atom of chromium, and evaluated in polymerization tests. In the polymerizations ethylene, maintained at 10 mol percent, was polymerized at 210° F. for test periods of one hour under hydrogen pressure. In a first series of runs (Examples 5, 7, 9 and 11) the reactor was at 30 psi hydrogen pressure, while in a second series of runs (Examples 6, 8, 10 and 12) the reactor was at 120 psi hydrogen.

The melt indexes of the polyethylenes produced in the respective runs were determined and are set forth in Table III below. As will be noted from the table the polymer melt indexes vary in accordance with calcination temperatures as well as hydrogen pressures, maximum melt indexes being achieved with catalysts subjected to calcining at temperatures of from about 500° to 1400° F. in the course of the indicated double-activation treatment.

TABLE III

CATALYSTS PREPARED UNDER VARYING DOUBLE-ACTIVATION CONDITIONS

| Example | Productivity* | Melt Index |
|---|---|---|
| 200° F. Calcination Temperature, H$_2$ Pressure = 30 psi | | |
| 5 | 633 | 11.8 |
| 6 | 261 | 36.2 |
| 7 | 162 | 74.5 |
| 8 | 183 | 83.5 |
| 200° F. Calcination Temperature, H$_2$ Pressure = 120 psi | | |
| 9 | 567 | 16.4 |
| 10 | 754 | 19.4 |
| 500° F. Calcination Temperature, H$_2$ Pressure = 30 psi | | |
| 11 | 396 | 28.8 |
| 12 | 747 | 15.2 |
| 13 | 1032 | 16.6 |
| 500° F. Calcination Temperature, H$_2$ Pressure = 120 psi | | |
| 14 | 475 | 126 |
| 15 | 181 | 149 |
| 16 | 482 | 190.4 |
| 17 | 580 | 156 |
| 1000° F. Calcination Temperature, H$_2$ Pressure = 10 psi | | |
| 18 | 446 | 39.3 |
| 19 | 551 | 29 |
| 20 | 917 | 6.2 |
| 21 | 399 | 39.2 |
| 1000° F. Calcination Temperature, H$_2$ Pressure = 30 psi | | |
| 22 | 443 | 58 |
| 23 | 748 | 52.8 |
| 24 | 223 | 98 |
| 25 | 340 | 60 |
| 1400° F. Calcination Temperature, H$_2$ Pressure = 30 psi | | |

TABLE III-continued

CATALYSTS PREPARED UNDER VARYING DOUBLE-ACTIVATION CONDITIONS

| Example | Productivity* | Melt Index |
|---|---|---|
| 26 | 456 | 41.8 |
| 27 | 431 | 84.0 |
| 28 | 507 | 66.5 |
| 29 | 476 | 40.6 |
| 30 | 710 | 21.4 |
| 1400° F. Calcination Temperature, $H_2$ Pressure = 120 psi | | |
| 31 | 280 | 67.2 |
| 32 | 143 | 74.2 |
| 33 | 246 | 82 |
| 34 | 348 | 72 |

*Determined as grams polyethylene per gram catalyst per hour duration of polymerization.

As indicated hereinabove, it will be apparent to those skilled in the art that various changes may be made in the preceding techniques for the preparation and use of the catalyst hereof without departing from the scope of the present invention. Accordingly, it is intended that the preceding description be construed as illustrative only and not in a limiting sense.

What is claimed is:

1. A process for the preparation of a catalyst material comprising coating a xerogel consisting of silica as the major constituent and having surface hydroxyl groups, a surface area in the range of 200 to 500 m²/g, a pore volume greater than about 2.0 cc/g, a major portion of which pore volume is provided by pores having pore diameters in the range of from 300 to 600 Å with an aluminum compound capable of reacting with said surface hydroxyl groups and having the formula Al(X-)$_a$(OR)$_b$, wherein X is R, a is 0-2, b is 1-3, a+b is 3, and R is an alkyl group having from 1 to 8 carbon atoms in an amount sufficient to provide from about 0.1 to 10% of aluminum by weight based on the weight of the xerogel, calcining the support material having the aluminum compound thereon at temperatures of at least 200° F., depositing on the aluminum coated calcined material an organophosphoryl chromium reaction product of chromium trioxide and an organophosphorus compound of the formula:

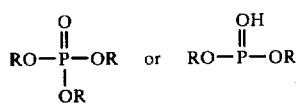

wherein R is hydrogen, or alkyl, aralkyl, aryl, or cycloalkyl, but al least one R is other than hydrogen in an amount sufficient to provide from about 0.25 to 2.5% of chromium by weight based on the weight of the Xerogel; and activating the thus treated support in a non-reducing atmosphere at temperatures of from 1550° F. and up to the decomposition temperature of the support, said activating temperature being in excess of said calcining temperature.

2. The process according to claim 1, wherein the activation is carried out at a temperature of from about 1550° F. to 1800° F.

* * * * *